Patented Feb. 5, 1952

2,584,103

UNITED STATES PATENT OFFICE 2,584,103

ALKYLATION OF AROMATIC HYDROCARBONS

Herman Pines and Vladimir N. Ipatieff, Chicago, Ill., assignors to Universal Oil Products Company, Chicago, Ill., a corporation of Delaware No Drawing. Application July 16, 1949, Serial No. 105,266

14 Claims. (Cl. 260—671)

This invention relates to the alkylation of aromatic compounds and particularly to the alkylation of aromatic hydrocarbons in the presence of a particular type of catalyst. More specifically, the process is concerned with the production of monoalkylated and polyalkylated aromatic hydrocarbons in the presence of a catalyst formed by reacting alumina with a hydrogen halide.

An object of this invention is the production of alkylated aromatic compounds.

Another object of this invention is the production of alkylated aromatic hydrocarbons.

A further object of this invention is the production of monoalkylated benzene hydrocarbons.

One specific embodiment of this invention relates to a process for producing alkylated aromatic hydrocarbons which comprises reacting an aromatic hydrocarbon having a replaceable nuclear hydrogen atom with an olefin-acting compound at alkylating conditions in the presence of a composite formed by treating alumina with a hydrogen halide.

Another embodiment of this invention relates to a process for producing alkylated aromatic hydrocarbons which comprises reacting an aromatic hydrocarbon having a replaceable nuclear hydrogen atom with an olefin-acting compound at alkylating conditions in the presence of a composite formed by treating alumina with hydrogen fluoride.

We have found that activated alumina treated with a hydrogen halide and particularly with hydrogen fluoride, to have a halogen content of from about 0.5 to about 30% by weight of halogen, is an excellent catalyst for the alkylation of an aromatic hydrocarbon with an olefin-acting compound and particularly with an olefinic hydrocarbon.

The olefin-acting compounds include monoolefinic and polyolefinic hydrocarbons, monohaloalkanes, sometimes referred to as alkyl halides, and alkoxy compounds, the latter including alcohols, ethers and esters, particularly esters of organic acids. These olefin-acting compounds which are utilized as alkylating agents contain preferably at least four carbon atoms per molecule. Alkoxy compounds which may be used as alkylating agents in this process may be represented by the general formula ROQ, wherein R corresponds to an alkyl radical, O represents an oxygen atom, and Q corresponds to a member selected from the group consisting of hydrogen, a hydrocarbon radical such as alkyl, aryl, or naphthyl, and an acid group, particularly a monocarboxylic acid group. In the latter case, Q represents a group of the type of formyl, acetyl, propionyl and the like. Other esters which serve as suitable sources of alkyl groups comprise esters of mineral acids such as the alkyl sulfates and alkyl esters of acids of phosphorus.

The different olefin-acting compounds which are utilizable in this process may react with the aromatic hydrocarbon charge to produce alkylated aromatic hydrocarbons or these different olefin-acting compounds may produce olefinic compounds as intermediates, or at least as transient intermediates, during the course of the reaction which results in the formation of alkylated aromatic hydrocarbons.

Catalysts suitable for use in effecting the process of the present invention comprise activated alumina which has been reacted further with a hydrogen halide, particularly hydrogen fluoride or hydrogen chloride. Of these activating agents, hydrogen fluoride is preferred. In producing the catalyst for this process, alumina is treated with varying concentrations of hydrofluoric acid and for a time sufficient to obtain a composite which after drying has a fluorine content of from about 0.5 to about 30% by weight of fluorine.

Although alumina treated with hydrofluoric acid is a preferred catalyst for this aromatic alkylation process, the addition of small amounts (0.01 to about 10% by weight) of other acid-producing and acid-acting compounds such as alkyl chlorides, hydrogen chloride, an acid-acting metal chloride, or other acid-acting salt in conjunction with alumina may also be employed as catalyst for this process.

In using an acid-acting salt in conjunction with alumina, it is preferred that the added material be either insoluble or only slightly soluble in water. Instead of alumina, both synthetic and naturally occurring silica-alumina composites, including acid-treated clays, may be used for producing alkylation catalyst, or the finished catalyst may contain at least one member of the group consisting of silica, alumina, magnesia and thoria.

In effecting reaction between an aromatic hydrocarbon such as benzene and an olefin-acting alkylating agent such as a mono-olefin having at least four carbon atoms per molecule, the exact method of procedure varies with the nature of the reacting constituents. A simple procedure, utilizable in the case of an aromatic hydrocarbon which is normally liquid, or if solid is readily soluble or easily dispersed in a substantially inert liquid, and an olefin, consists in contacting the aromatic hydrocarbon and olefin with an alumina-fluorine containing catalyst at a temperature of from about 250° to about 475° C. and preferably at a temperature of from about 300° to about 425° C. and at a pressure of from about 1 to about 75 atmospheres. Intimate contact of the reacting components with the catalyst is effected by passing the reaction mixture through a fixed bed of granular or pelleted catalyst or the reacting components may be mixed with finely divided catalyst and reacted in either a batch or continuous type of operation. In a reaction mixture it is preferable to have present from about 2 to about 20 molar proportions of aromatic hydrocarbon for each molar proportion of alkoxy compound or other olefin-acting substance introduced thereto. By maintaining a substantial molar excess of aromatic hydrocarbon to olefin-acting substance throughout the entire reaction, it is possible to diminish the formation of olefin polymers and to favor the production of monoalkylated aromatic compounds with relatively small formation of more highly alkylated materials. The addition of a hydrogen-containing gas to the reaction mixture frequently has a beneficial effect upon the reaction.

In a typical operation of the process of this invention, a normally liquid aromatic hydrocarbon and a normally liquid olefin are charged simultaneously to a reactor containing a fluorine-containing alumina composite maintained at the above indicated temperature and preferably at a superatmospheric pressure. Also a portion of the aromatic hydrocarbon such as benzene may be charged to the reactor containing a fixed bed of solid catalyst while a fraction containing an olefin or other olefin-acting compound is introduced at various points between the inlet and the outlet of the reaction zone in such a manner that the reaction mixture being contacted with the catalyst will at all times contain a relatively low proportion of olefin-acting compound and thus favor the formation of monalkylated aromatic hydrocarbons rather than more highly alkylated aromatic hydrocarbons. The gradual introduction of an olefin acting substance throughout the reaction zone also has a tendency to diminish the formation of olefin polymers which sometimes occurs in the presence of the aforementioned catalyst.

While the method of passing the aromatic and olefin-acting compounds either together, concurrently or countercurrently through a suitable reactor containing a granular catalyst is the generally customary procedure, the interaction of these organic compounds may also be effected in a closed vessel in which the reacting components are in liquid phase or vapor phase and in which the catalyst is preferably in finely divided or powdered form and is maintained in dispersion or suspension by some method of agitation. The choice of operating procedure is determined by the circumstances, such as the temperature, pressure and activity of the catalyst found to be effective for producing the desired reaction between aromatic and olefin-acting compounds.

The reaction products obtained by treating an aromatic hydrocarbon with an alkoxy compound according to the process of this invention consist of hydrocarbons together with certain amounts of water or organic acid. The product contains water in case the alkoxy compound is an alcohol or an ether, while an organic acid is present when the alkoxy compound consists of an alkyl ester of an organic acid. In general, the hydrocarbon products formed in the process are separated from unreacted aromatic hydrocarbons by suitable means as by distillation and the unreacted portion of the aromatic hydrocarbons originally charged and sometimes the polyalkylated aromatic hydrocarbons formed in the process are returned to the process and mixed with additional quantities of the aromatic hydrocarbon and olefin-acting compound being charged to contact with the catalyst. The total alkylated product thus formed from the excess of the originally charged aromatic hydrocarbon is separated into the desired fractions by distillation at ordinary or reduced pressure or by other suitable means.

The following example is given to illustrate results obtained by the present process, although this example is not introduced with the intention of restricting unduly the generally broad scope of the invention.

Activated alumina in the form of 5 x 5 mm. pellets was treated with varying concentrations of hydrofluoric acid and the resultant material was then dried. Dried catalytic materials were thus obtained containing 1.6, 3.6, and 8.2% by weight of fluorine.

Several runs were made in which benzene was alkylated by 2-butene in the presence of the catalysts produced as described above. The alkylation treatment was carried out by placing 50 cc. of the catalyst composite in a steel tube through which a mixture of 1 mole of 2-butene and 2.5 moles of benzene were charged continuously during a time of 3 hours while the reaction tube and catalyst were maintained at a temperature of 360–370° C. This alkylation treatment was carried out at a pressure of 40 atmospheres and at an hourly liquid space velocity of 1. (ml. of hydrocarbons/ml. of catalyst/hour).

The operating conditions used in these runs and the results obtained are indicated briefly in the table.

TABLE

Reaction of 2-butene with benzene

| Experiment No. | 1 | 2 | 3 | |
|---|---|---|---|---|
| Catalyst, Kind | Alumina containing— | | | |
| | 0.0% F | 1.6% F | 3.6% F | 8.2% F |
| Hydrocarbons charged: | | | | |
| Benzene, moles | 2.5 | 2.5 | 2.5 | 2.5 |
| 2-Butene, moles | 2 | 1.0 | 1.0 | 1.0 |
| Experimental Conditions—Temperature, ° C | 370 | 370 | 370 | 360 |
| Product Formed: | | | | |
| Dimers ($C_8H_{16}$), mole per cent | (¹) | 17 | 25 | 20 |
| Butylbenzenes, mole per cent | (¹) | 27 | 35 | 31 |
| Dibutylbenzene, mole per cent | (¹) | 28 | 18 | 28 |
| Composition of the Butylbenzenes: | | | | |
| t-Butylbenzene, per cent | | 2 | 6 | 5 |
| sec-Butylbenzene, per cent | | 98 | 94 | 95 |

¹ No product.

From the results given in the table, it is noted that the monobutyl benzenes produced in these alkylation treatments contained small amounts of tertiary butyl benzene in addition to secondary butyl benzene, the latter being the main reaction product. The extent of the isomerization of the butyl group accompanying alkylation increased in general with the fluorine content of the catalyst.

We claim as our invention:

1. A process for producing alkylated aromatic hydrocarbons which comprises reacting an aromatic hydrocarbon having a replaceable nuclear hydrogen atom with an olefin-acting compound at alkylating conditions in the presence of a pre-formed reaction product of alumina with a hydrogen halide, said reaction product containing from about 0.5% to about 30% by weight of halogen chemically combined with the alumina.

2. A process for producing alkylating aromatic hydrocarbons which comprises reacting an aromatic hydrocarbon having a replaceable nuclear hydrogen atom with an olefin-acting compound at alkylating conditions in the presence of a pre-formed reaction product of alumina with hydrogen fluoride, said reaction product containing from about 0.5% to about 30% by weight of fluorine chemically combined with the alumina.

3. A process for producing alkylated aromatic hydrocarbons which comprises reacting an aromatic hydrocarbon having a replaceable nuclear hydrogen atom with an olefin-acting compound at a temperature of from about 250° to about 475° C. in the presence of a pre-formed reaction product of alumina with hydrogen fluoride, said reaction product containing from about 0.5 to about 30% by weight of fluorine chemically combined with the alumina.

4. A process for producing alkylated aromatic hydrocarbons which comprises reacting an aromatic hydrocarbon having a replaceable nuclear hydrogen atom with an olefin-acting compound at a temperature of from about 250° to about 475° C. in the presence of a pre-formed catalyst formed by reacting alumina with sufficient hydrogen fluoride to form a composite containing from about 0.5 to about 30 per cent by weight of fluorine in chemical combination with the alumina.

5. A process for producing alkylated aromatic hydrocarbons which comprises reacting an aromatic hydrocarbon having a replaceable nuclear hydrogen atom with an olefin-acting compound at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

6. A process for producing alkylated aromatic hydrocarbons which comprises reacting from about 2 to about 20 molecular proportions of an aromatic hydrocarbon having a replaceable nuclear hydrogen atom with one molecular proportion of an olefin-acting compound at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

7. A process for producing alkylated aromatic hydrocarbons which comprises reacting from about 2 to about 20 molecular proportions of an aromatic hydrocarbon having a replaceable nuclear hydrogen atom with one molecular proportion of a monoolefinic hydrocarbon at a temperature of from about 250° to about 475° C. and at a pressure from 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

8. A process for producing alkylated aromatic hydrocarbons which comprises reacting from about 2 to about 20 molecular proportions of an aromatic hydrocarbon having a replaceable nuclear hydrogen atom with one molecular proportion of an alkyl halide at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

9. A process for producing alkylated aromatic hydrocarbons which comprises reacting from about 2 to about 20 molecular proportions of an aromatic hydrocarbon having a replaceable nuclear hydrogen atom with one molecular proportion an alkoxy compound at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

10. A process for producing alkylated benzene hydrocarbons which comprises reacting from about 2 to about 20 molecular proportions of a benzene hydrocarbon having a replaceable nuclear hydrogen atom with one molecular proportion of an olefin-acting compound at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

11. A process for producing alkylated benzene hydrocarbons which comprises reacting from about 2 to about 20 molecular proportions of a benzene hydrocarbon having a replaceable nuclear hydrogen atom with one molecular proportion of a monoolefin at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

12. A process for producing a butyl benzene hydrocarbon which comprises reacting from about 2 to about 20 molecular proportions of a benzene hydrocarbon having a replaceable nuclear hydrogen atom with one molecular proportion of a butylene at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

13. A process for producing a butyl benzene hydrocarbon which comprises reacting from about 2 to about 20 molecular proportions of a benzene hydrocarbon having a replaceable nuclear hydrogen atom with one molecular proportion of a normal butylene at a temperature of from about 250° to about 475° C. and at a pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

14. A process for producing a butyl benzene hydrocarbon which comprises reacting from about 2 to about 20 molecular proportions of a benzene hydrocarbon having a replaceable nuclear hydrogen atom with one molecular proportion of isobutylene at a temperature of from about 250° to about 475° C. and at pressure of from about 1 to about 75 atmospheres in the presence of a pre-formed catalyst formed by reacting alumina with sufficient hydrogen fluoride to form a composite containing from about 0.5 to about 30 per cent by weight of fluorine in chemical combination with the alumina.

HERMAN PINES.
VLADIMIR N. IPATIEFF.

REFERENCES CITED

The following references are of record in the file of this patent:

UNITED STATES PATENTS

| Number | Name | Date |
|---|---|---|
| 2,115,884 | Schollkopf | May 3, 1938 |
| 2,360,814 | Mattox | Oct. 17, 1944 |
| 2,373,062 | Stahly | Apr. 3, 1945 |
| 2,396,683 | Carmody et al. | Mar. 19, 1946 |
| 2,405,874 | Bullard et al. | Aug. 13, 1946 |
| 2,410,498 | Hepp | Nov. 5, 1946 |
| 2,413,868 | Frey | Jan. 7, 1947 |
| 2,428,923 | Thomas et al. | Oct. 14, 1947 |
| 2,436,698 | Oblad | Feb. 24, 1948 |